(12) United States Patent
Brown

(10) Patent No.: US 7,427,072 B2
(45) Date of Patent: Sep. 23, 2008

(54) ACTIVE VEHICLE SUSPENSION

(75) Inventor: Steven N. Brown, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 442 days.

(21) Appl. No.: 10/871,231

(22) Filed: Jun. 18, 2004

(65) Prior Publication Data
US 2005/0280219 A1 Dec. 22, 2005

(51) Int. Cl.
*B60G 17/015* (2006.01)
(52) U.S. Cl. ........................ 280/5.5; 280/5.52
(58) Field of Classification Search ............... 280/5.5, 280/5.507, 5.508, 124.106, 124.107, 5.52
See application file for complete search history.

(56) References Cited

U.S. PATENT DOCUMENTS

| | | | |
|---|---|---|---|
| 5,009,447 A | 4/1991 | Gabel | |
| 5,441,298 A | 8/1995 | Miller et al. | |
| 5,481,458 A | 1/1996 | Harara et al. | |
| 5,704,632 A | 1/1998 | Lee | |
| 5,722,673 A | 3/1998 | Mauz | |
| 5,740,039 A | 4/1998 | Hirahara et al. | |
| 5,765,858 A | 6/1998 | Kawagoe et al. | |
| 5,782,484 A | 7/1998 | Kuhn, Jr. | |
| 5,823,552 A | 10/1998 | Etnyre et al. | |
| 5,845,926 A | 12/1998 | Davis et al. | |
| 5,851,016 A | 12/1998 | Kawagoe et al. | |
| 5,868,410 A | 2/1999 | Kawabe et al. | |
| 5,873,587 A | 2/1999 | Kawabe et al. | |
| 5,879,026 A | 3/1999 | Dostert et al. | |
| 5,895,063 A | 4/1999 | Hasshi et al. | |
| 5,896,941 A | 4/1999 | Kajiwara et al. | |
| 5,899,288 A | 5/1999 | Schubert et al. | |
| 6,000,702 A | 12/1999 | Streiter | |
| 6,113,119 A | 9/2000 | Laurent et al. | |
| 6,945,541 B2 * | 9/2005 | Brown | 280/5.507 |
| 2004/0154886 A1 * | 8/2004 | Hio et al. | 188/266 |

FOREIGN PATENT DOCUMENTS

EP 0 782 938 7/1997

(Continued)

OTHER PUBLICATIONS

Minakawa, M., et al., *A Vibration Transfer Reduction Technique, Making Use of the Directivity of the Force Transmitted from Road to Surface Tire*, Society of Automotive Engineers, Inc., 2000, pp. 37-44.

(Continued)

*Primary Examiner*—Faye M. Fleming
(74) *Attorney, Agent, or Firm*—Fish & Richardson P.C.

(57) ABSTRACT

An active wheel suspension for suspending a wheel assembly from a sprung body of a wheeled vehicle, and adapted to permit a center of the wheel assembly to move relative to the sprung body through a jounce and rebound travel and defining a wheel center locus path relative to the body, the suspension including an actuator connected to both the wheel assembly and the sprung body and adapted to apply an active control force between the body and wheel assembly to move the wheel assembly. The wheel suspension is configured such that a tangent to the wheel center locus path is inclined rearward with respect to vertical with the wheel center at nominal ride height.

43 Claims, 5 Drawing Sheets

FOREIGN PATENT DOCUMENTS

| | | | |
|---|---|---|---|
| EP | 1 440 826 A | | 7/2004 |
| JP | 60 047714 A | | 7/1985 |
| JP | 07001936 A | | 1/1995 |
| JP | 11042919 A | * | 2/1999 |

OTHER PUBLICATIONS

Gillespie, T.D. *Fundamentals of Vehicle Dynamics*. Pennsylvania, Society of Automotive Engineers, Inc., 1992. pp. 125-193. TL243-G548.

Barak, "Passive Versus Active and Semi-Active Suspension from Theory to Application in North American Industry," Worldwide Passenger Car Conference and Exposition, Dearborn, Michigan, Sep. 28-Oct. 1, 1992 (conference).

Barak, "Magic Numbers in Design of Suspensions for Passenger Cars," *Safe 1991 Transactions Journal of Passenger Cars*, Section 6-vol. 100, pp. 1698-1733, 1992.

Staniforth, "Race Tech," Race Car Technology, p. 142, 1988, Competition Car Suspension.

European Examination Report dated Jun. 8, 2005, issued in European Application No. 05104988.0, filed Jun. 18, 2007.

Office Action, issued in corresponding China Application Serial No. 200510078390.5, dates Feb. 15, 2008.

Barak, "Passive Versus Active and Semi-Active Suspension from Theory to Application in North American Industry," Worldwide Passenger Car Conference and Exposition, Dearborn, Michigan, Sep. 28- Oct. 1, 1992 (conference).

Barak, "Magic Numbers in Design of Suspensions for Passenger Cars," *Safe 1991 Transactions Journal of Passenger Cars*, Section 6-vol. 100, pp. 1698-1733, 1992.

Gillespie, "Chapter 7- Suspensions," *Fundamentals of Vehicle Dynamics*, pp. 268-273, 1992.

Staniforth, "Race Tech," *Race car Technology*, p. 142, 1988, Competition Car Suspension.

\* cited by examiner

ACTIVE VEHICLE SUSPENSION

TECHNICAL FIELD

This invention relates to active suspensions for wheeled vehicles, such as automobiles.

BACKGROUND

A primary purpose of a vehicle's suspension system is to provide vertical compliance between the road and the chassis, in order to isolate the chassis occupants from the roughness in the road and to maintain tire contact with the road, thus providing a path for transferring forces from the bottom of the tire to the chassis, such as to change the speed or direction of the vehicle. Examples of some common independent suspension linkages are known generally as strut & link (also called MacPherson strut), double A-arm (also called double wishbone or SLA), semi-trailing arm, and multi-link.

Each wheel assembly is connected to the chassis by one or more links. A link is defined as a substantially rigid member with a joint or joints at each end that allows a particular motion to take place. It is these links that control the motion (or path) of the wheel as it moves up and down over road bumps. These links also have to transmit the forces generated at the tire-road interface to the chassis.

In an active suspension, controlled forces are introduced to the suspension, such as by hydraulic or electric actuators, between the sprung mass of the vehicle body and its occupants, and the unsprung mass of the wheel assemblies. The unsprung mass is the equivalent mass that reproduces the inertial forces produced by the motions of those parts of the vehicle not carried by the suspension system. This primarily includes the wheel assemblies, any mass dampers associated with the wheel assemblies, and some portion of the mass of the suspension links. The sprung mass is the mass of those parts of the vehicle carried by the suspension system, including the body. Active suspension systems preferably are able to introduce forces that are independent of relative wheel motions and velocities.

U.S. Pat. No. 4,981,309 discloses an active suspension system employing electro-magnetic actuators at each wheel assembly of a rolling vehicle. U.S. Pat. No. 6,364,078, and EP publication 0982162, published Mar. 1, 2000, together disclose a mass damper useful with such electromagnetic suspension actuators and that can move independent of the wheel assembly, but only in a substantially vertical direction. In all other directions, the mass of the mass damper is effectively added to the inertia of the unsprung mass. The entire contents of the above U.S. patents are incorporated herein by reference as if set forth in their entirety.

Generally, all kinematically-induced wheel forces are either forces created by the interaction between the tires and the road, or inertia forces generated by the motion of the unsprung mass. The forces occurring between the tires and road are transferred via the suspension system to the body. Horizontal tire patch forces include both a lateral (i.e., side-to-side) component and a longitudinal (i.e., fore-aft) component. On a smooth road, the longitudinal component is predominantly a result of rolling friction against the road surface, and the lateral component a result of steering. On a non-smooth road, motion of the wheels up and down with respect to the body can introduce other lateral and longitudinal loads at the tire patch, as a result of suspension geometry.

The static toe angle of a wheel, measured at a specific height of the wheel relative to the chassis, is the angle between the central longitudinal axis of the vehicle and the line intersecting the center plane of one wheel with the road surface. A wheel is "toed-in" if the forward portion of the wheel is turned toward the vehicle's central longitudinal axis, and "toed-out" if turned away. It is desirable that the static toe angle be very close to zero degrees at speed, to reduce tire wear and rolling resistance. It is also important for handling considerations whether the toe angle, which is normally set when the vehicle is stationary, changes with speed, roll, pitch or wheel jounce and rebound. Roll is the rotation of the vehicle body about a longitudinal axis of the vehicle, such as is induced during sharp cornering, especially with very soft suspension rates. Pitch is rotation of the body about the lateral axis of the vehicle, such as is induced by heavy braking or acceleration. Jounce is the relative displacement of the wheel upward toward the body from the static condition, typically compressing the suspension springs, while rebound is the relative displacement of the wheel downward, away from the body, from the static condition. As the wheel moves up and down relative to the body, the center of the wheel moves relative to the body along a path called the 'wheel center locus path' that in most standard suspensions is non-linear and is most significantly determined by suspension geometries.

Active suspensions can be employed to minimize vertical forces transferred to the body from the wheels, such as by actively moving the wheels relative to the body in such a way that as the wheel goes over a bump in the road, for example, the wheel moves up and down but the vehicle body, as viewed from outside the car, does not. Such an effect requires actively introducing a force between the wheel and body through the suspension actuator. As a result, in an active suspension the wheel center will tend to travel along its locus path a greater overall distance (i.e., spend more time in more significant jounce and rebound positions) than in a typical passive suspension that must rely solely on dampers and spring force to keep the suspension from reaching the end of its travel and 'bottoming out'. As a result, extreme jounce and rebound of the wheel can occur more frequently in active suspension vehicles, as the suspension works to keep the body steady.

Improvements in active suspension configuration are generally needed, particularly in light of the challenges introduced by active control and the resulting jounce/rebound intensity.

SUMMARY

In the course of my research I have discovered that when pitch, roll and vertical body motions and vibrations are greatly reduced or eliminated by an active suspension system of appropriate bandwidth, secondary forces associated with small horizontal wheel motions (that are normally masked by other vehicle body motion) become both perceptible and subjectively very objectionable.

These forces can be objectionable not only because of the elimination of other body motions, but also because active suspension systems tends to exaggerate their effect by employing more of the available suspension travel, more often, than occurs with a conventional suspension. Also, incorporation of significant damping mass in the wheel assemblies increases horizontal wheel inertia and can further exaggerate induced loads. As a general analogy, under active suspension control the vehicle body can be controlled to move at speed along a substantially linear path (like a cruise missile), while the wheels are actively moved up and down over road surface irregularities as needed. Ideally, the body itself is moved in other than a purely forward linear direction in response to road inputs (such as bumps or potholes) only when available wheel travel is determined to be insufficient to adequately absorb such inputs. This differs substantially from a conventional suspension in which progressive springs, bumpers and dampers always exert force on the vehicle body based on the position and velocity of the wheel relative to the vehicle body.

Some embodiments feature particularly low horizontal kinetic displacement of a vehicle suspension. Broadly defined with respect to a quarter-vehicle model and an independent suspension, horizontal kinetic displacement is the ratio of unsprung mass to sprung mass (acting on and associated with a given road wheel), multiplied by the horizontal displacement of the gravitational center of the unsprung mass. In other words, if the overall vehicle weight is 4000 pounds (18 kilo-Newtons), equally distributed across four wheels, the weight of the effective unsprung mass operating at one of the wheels is 250 pounds (1100 Newtons), and the gravitational center of that unsprung mass moves horizontally a maximum of 100 millimeters from a starting position through an associated range of wheel motion, then the maximum horizontal kinetic displacement of the suspension at that wheel would be (250/(4000/4))*100, or 25 millimeters. It will be understood that the horizontal displacement of the wheel hub will give a good approximation of the horizontal displacement of the gravitational center of the unsprung mass for most purposes. Horizontal displacement is meant to include any displacement occurring in a plane generally parallel to the road surface, whether related to changes in track width or wheelbase. In many cases, horizontal displacement will include a longitudinal component measured along an axis running in a direction of travel of the vehicle and a lateral component measured along an axis extending perpendicular to a direction of travel of the vehicle.

Various aspects of the invention feature an active wheel suspension for suspending a wheel assembly from a sprung body of a wheeled vehicle, and adapted to permit a center of the wheel assembly to move relative to the sprung body through a jounce and rebound travel and defining a wheel center locus path relative to the body.

According to one aspect of the invention, the suspension includes an actuator connected to both the wheel assembly and the sprung body and adapted to apply an active control force between the body and wheel assembly to move the wheel assembly. The wheel suspension is configured such that a tangent to the wheel center locus path is inclined rearward with respect to vertical with the wheel center at nominal ride height.

By "active control force" I mean forces introduced to a suspension by a controlled actuator. Such forces may be independent of relative wheel motions and velocities.

In some embodiments, the active wheel suspension is configured to move the wheel center through jounce and rebound along a substantially linear path with respect to the body, the linear path inclined rearward with respect to vertical.

The tangent to the wheel center locus path, in varying embodiments, defines a recession angle in a fore-aft plane with respect to vertical, the recession angle being between about 1 and 5 degrees. In other embodiments, the recession angle is between about 2 and 4 degrees. In one preferred embodiment, the recession angle is about 3 degrees.

In one application, the active wheel suspension includes an inclination actuator adapted to vary the rearward inclination of the tangent to the wheel center locus path as a function of vehicle speed. In some arrangements, the magnitude of the rearward inclination of the tangent to the wheel center locus path is configured to vary inversely with vehicle speed.

In some cases, the actuator is an electromagnetic actuator, such as a linear motor, for example.

In one application, the active wheel suspension is configured as a front wheel suspension of an automobile. In some cases, the actuator is positioned as a strut. In still other applications, the active wheel suspension is configured as a rear wheel suspension of an automobile.

In one example, the wheel assembly has a horizontally unsprung mass weight greater than about 120 pounds. In another example, the wheel assembly includes a damper mass vertically sprung with respect to the wheel assembly.

In one embodiment, the active wheel suspension is configured to produce an active control force between the body and wheel assembly over an active control range of at least 0.2 meters along the wheel center locus path.

In one case, the active wheel suspension includes mechanical stops which are positioned to allow at least about 2.0 inches (50 millimeters) of jounce and about 2.0 inches (50 millimeters) of rebound. The active wheel suspension can define a geometry selected to produce a maximum tread width change of less than about 5 millimeters through said jounce and rebound.

The active wheel assembly, in one embodiment, includes a structural link coupled to the wheel assembly to define a relative rotation center, and rotationally coupled to the sprung body at a pivot. In one example, the structural link is a first structural link coupled to the wheel assembly to define a first relative rotation center, and rotationally coupled to the sprung body at a first pivot, the suspension also including a second structural link coupled to the wheel assembly to define a second relative rotation center above the first relative rotation center, and rotationally coupled to the sprung body at a second pivot above the first pivot.

In some other applications, the active wheel suspension defines a geometry selected to produce a maximum horizontal kinetic displacement of the wheel assembly of less than about 4.0 millimeters as the actuator moves through its active control range. In one example, the active control range can cover a vertical displacement of a gravitational center of the wheel assembly of at least 0.2 meters.

In another case, the active wheel suspension defines a geometry selected to produce a maximum wheel toe change of less than about 0.1 degrees through said jounce and rebound travel.

In another example of the active wheel suspension, the lateral displacement of a tire patch defined between the wheel assembly and a support surface, multiplied by lateral tire stiffness, yields a maximum product of less than about 500 pounds (2200 Newtons).

In some other applications of the active wheel suspension, the overall angulation of a wheel rim of the wheel assembly about a vertical axis through the jounce and rebound travel, multiplied by a cornering stiffness of a tire of the wheel assembly, yields a product of less than about 30 pounds (130 Newtons).

In one example, the wheel suspension is configured for a rear wheel suspension including an upper structural member coupled to the wheel assembly to define an upper relative rotation center, and rotationally coupled to the sprung body at an upper pivot, and a lower structural member coupled to the wheel assembly to define a lower relative rotation center disposed on a side of a gravitational center of the wheel assembly opposite the upper relative rotation center, and rotationally coupled to the sprung body at a lower pivot.

According to another aspect of the invention, the invention features an active wheel suspension for suspending a wheel assembly from a sprung body of a wheeled vehicle, and adapted to permit a center of the wheel assembly to move relative to the sprung body through a jounce and rebound travel and defining a wheel center locus path relative to the body. The suspension includes an actuator connected to both the wheel assembly and the sprung body and adapted to apply an active control force between the body and wheel assembly to move the wheel assembly. The wheel suspension is configured such that a tangent to the wheel center locus path is inclined rearward to define a recession angle in a fore-aft plane with respect to vertical, the recession angle being between about 1 and 5 degrees with the wheel center at nominal ride height. The suspension is further configured to move the wheel center through jounce and rebound along a substantially linear path with respect to the body, the linear path inclined rearward with respect to vertical.

According to another aspect of the invention, the invention features a method of actuating an active wheel suspension including applying an active control force between a sprung vehicle body and wheel assembly to move the wheel assembly and moving a center of the wheel assembly relative to the sprung body through a jounce and rebound travel along a wheel center locus path relative to the body, the tangent to the wheel center locus path being inclined rearward with respect to vertical with the wheel center at nominal ride height.

In one application, the method includes moving the center of the wheel assembly through jounce and rebound along a substantially linear path with respect to the body.

In one example, the method includes varying the rearward inclination of the tangent to the wheel center locus path as a function of vehicle speed. In another example, the magnitude of the rearward inclination of the tangent to the wheel center locus path is configured to vary inversely with vehicle speed.

Various aspects of the invention provide particularly pleasing ride characteristics, particularly in the context of fully active passenger vehicle suspensions. In many cases, the invention features combinations of suspension parameters previously considered unacceptable in conventional suspension configurations.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
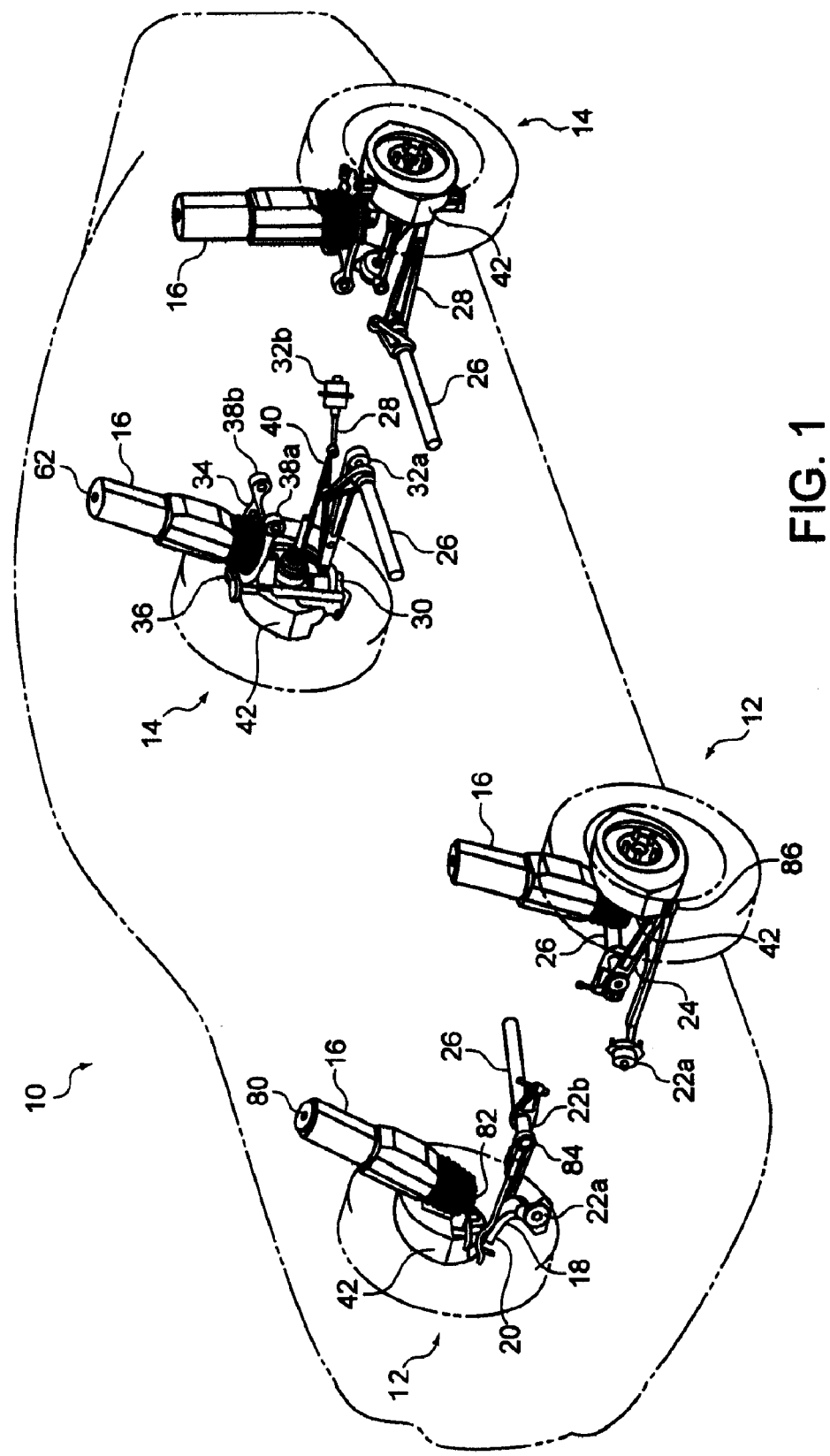
FIG. 1 is a perspective view of an active passenger vehicle suspension system.

Referring first to FIG. 1, the suspension of passenger vehicle 10 includes two independent front wheel suspension assemblies 12 and two independent rear wheel suspension assemblies 14, each including an electromagnetic actuator 16 connecting a corresponding wheel assembly to the body. In this illustrated system, the actuators 16 in the front suspension are generally positioned where one would expect to find a passive damper (e.g., shock absorber or strut) in a conventional suspension, although the function of actuators 16 is significantly different from that of a passive damper. Other major components of front suspensions 12 include lower control arms 18 pivotally connected to the front wheel assemblies at lower ball joints 20 and to the suspended body at lower arm bushes 22a and 22b; adjustable tie rods 24 pivotally connected to steering knuckles of the front wheel assemblies and to a connecting steering linkage (not shown); and torsion springs 26 connecting the suspended body with lower control arms and arranged to resist suspension deflection caused by static vehicle load, biasing the control arms to a desired neutral position. Major components of rear suspensions 14 include lower control arms 28 pivotally connected to the rear wheel assemblies at lower ball joints 30 and to the suspended body at lower arm bushes 32a and 32b; upper control arms 34 pivotally connected to the rear wheel assemblies at upper ball joints 36 and to the suspended body at upper arm bushes 38a and 38b; adjustable toe links 40 pivotally connecting the rear wheel assemblies and suspended body for setting static rear toe angles; and torsion springs 26 of similar purpose as in the front suspensions. All control arm bushing axes extend generally parallel to the fore-aft centerline of the vehicle. Links extending between rotatable pivots, as opposed to links extending through sliding journals or the like, need only be configured and mounted to support tensile and compressive loads, and need not resist substantial moments or bending loads, reducing required weight and size of the links.

Each front and rear wheel assembly includes a mass damper assembly 42 packaged within the hub of the wheel as disclosed in U.S. Pat. No. 6,364,078. Tuned mass dampers 42 are essentially substantive reactive masses connected to the rest of the wheel assembly by respective springs and dampers (not shown) and constrained to move with respect to the wheel assembly only in a substantially vertical direction.

Figure 2:
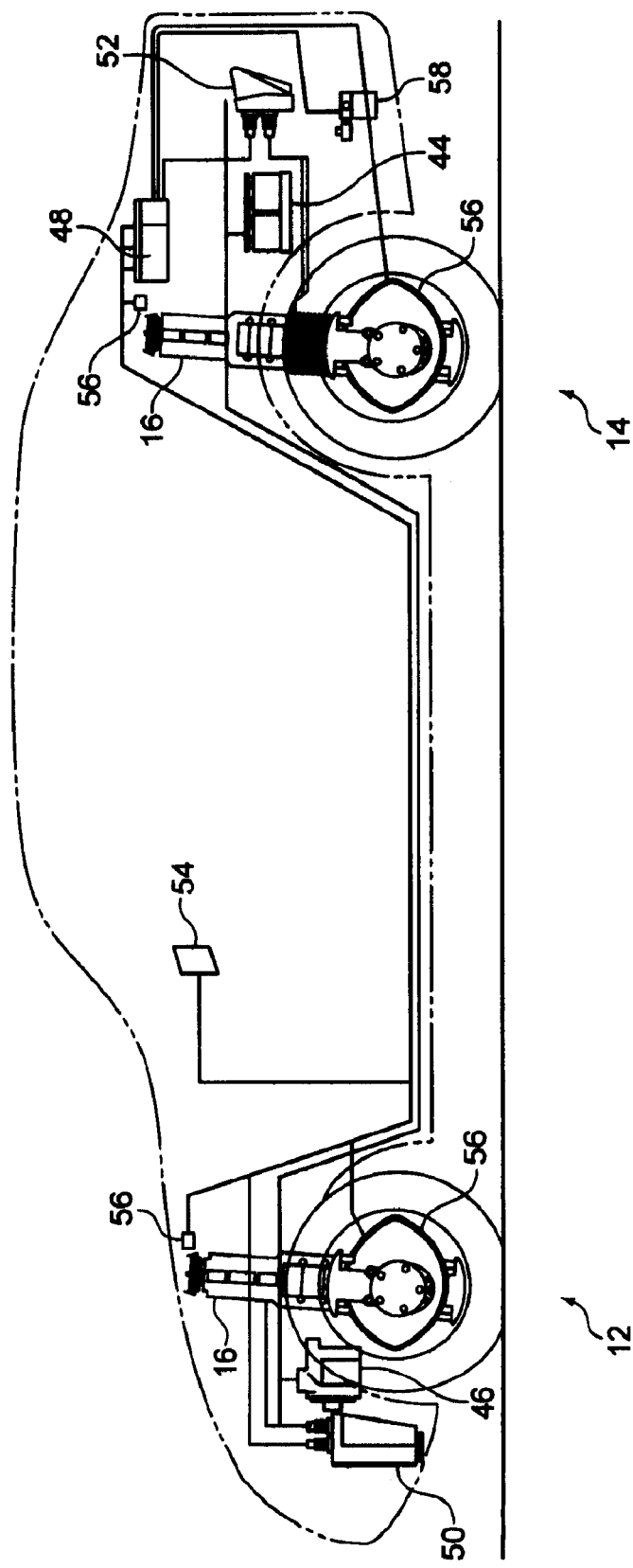
FIG. 2 is an overall electrical schematic of the suspension system, showing major components.

Referring next to FIG. 2, actuators 16 form part of an integrated and active vehicle suspension control system that actively controls relative wheelbody kinematic and kinetic parameters (e.g., loads, displacements and their rates) as a function of various system inputs. The system receives electrical power from a storage battery 44 or other electrical storage device charged by a generator 46 associated with the vehicle propulsion system (not shown). A central suspension control module (SCU) 48 controls how electrical power from battery 44 is applied to coils within each wheel actuator 16 to cause a desired wheel-body force or deflection response, sending signals to front amplifiers 50 and rear amplifiers 52 that drive the actuators of the front and rear wheel assemblies, respectively. The SCU receives inputs from individual accelerometers 56 positioned to sense vertical body acceleration adjacent each upper actuator connection and at each wheel assembly, and may receive additional input from a handwheel position sensor 54. Other or additional sensors may be employed as needed. In addition to controlling each actuator 16, SCU 48 may also control a load leveling system 58 as needed to reduce overall suspension power consumption from changes in static vehicle ride height and attitude. The SCU, collecting data from several sensors on the vehicle, calculates the actuator forces needed to provide the most comfortable ride. The SCU then commands each actuator to generate a force specifically calculated to keep the vehicle body virtually still, or to move in a desired manner, while allowing the wheels to travel up and down over bumps in the road.

Figure 3:
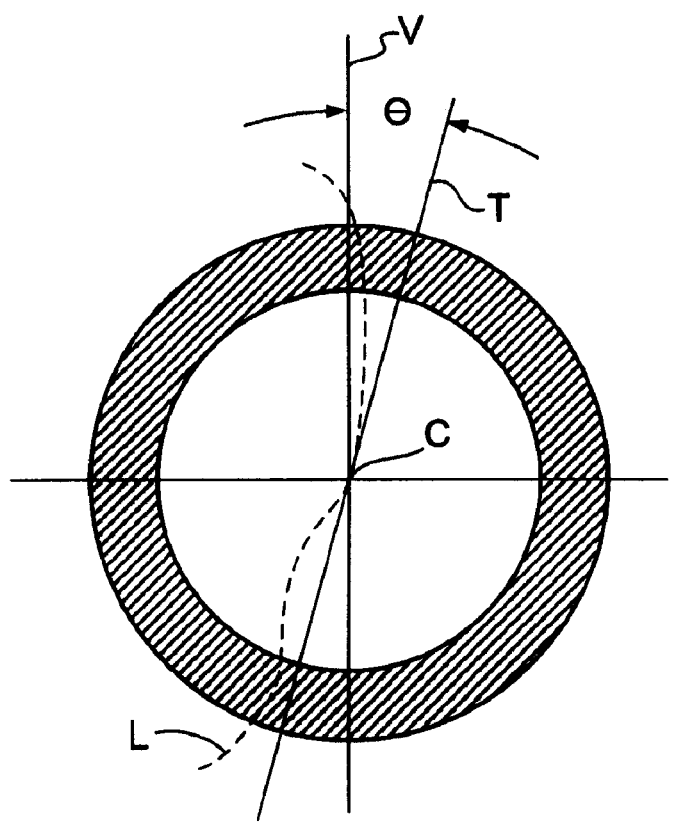
FIG. 3 is a schematic illustration of an exemplary embodiment of an active passenger vehicle suspension system.

Referring next to FIG. 3, an active wheel suspension, such as the active front suspensions 12 and/or the active rear suspensions 14 of FIG. 2, is configured to permit a center of the wheel assembly to move relative to the sprung body through a jounce and rebound travel and defining a wheel center locus path L relative to the body. The wheel suspension is further configured such that a tangent T to the wheel center locus path is inclined rearward with respect to vertical with the wheel center at nominal ride height, to reduce the longitudinal force transmitted to the car body thereby improving ride harshness. The active suspension is adapted to permit a center of the wheel assembly C to move relative to the sprung body through a jounce and rebound travel and defining a wheel center locus path L relative to the body. In one example, the suspension can include an actuator connected to both the wheel assembly and the sprung body and adapted to apply an active control force between the body and wheel assembly to move the wheel assembly. The wheel suspension can be configured such that a tangent to the wheel center locus path L is inclined rearward with respect to vertical with the wheel center at nominal ride height.

The center of the wheel assembly moves relative to the sprung body along locus path L. Because the resultant longitudinal force transmitted to the car body has directivity, inclining the tangent to the locus path L, a recession angle θ from the vertical axis V which substantially aligns with the resultant direction of force transmission from the road, reduces the longitudinal force transmitted to the car body. The recession angle θ varies at least as a function of vehicle speed. In one embodiment, the recession angle is between about 1 and 5 degrees. In another embodiment, the recession angle is between about 2 and 4 degrees. In still a further embodiment, the recession is about 3 degrees.

With continued reference to FIG. 3 and in another embodiment, the active control system can include an inclination actuator adapted to vary the recession angle θ with vehicle speed. In one example, the magnitude of the recession angle θ is configured to vary dynamically and inversely as a function of vehicle speed. For low car speeds (40 to 60 km/h), a rearward recession angle θ which matches the resultant direction of the road surface force transmission angle will reduce the longitudinal force transmitted from road surface to the car body. For higher car speeds, the rearward recession angle θ moves towards 0 degrees or vertical. In one embodiment, the individual subframes which connect the suspension system and the chassis can be displaced to provide desired rearward recession angle based on the car speed. The rear or both rear and front suspensions can be adjusted to provide the desired recession angle. An inclination actuator, such as a ball-screw actuator for example, can be used to vary the displacement of the subframe with respect to the chassis as a function of vehicle speed.

Figure 4:
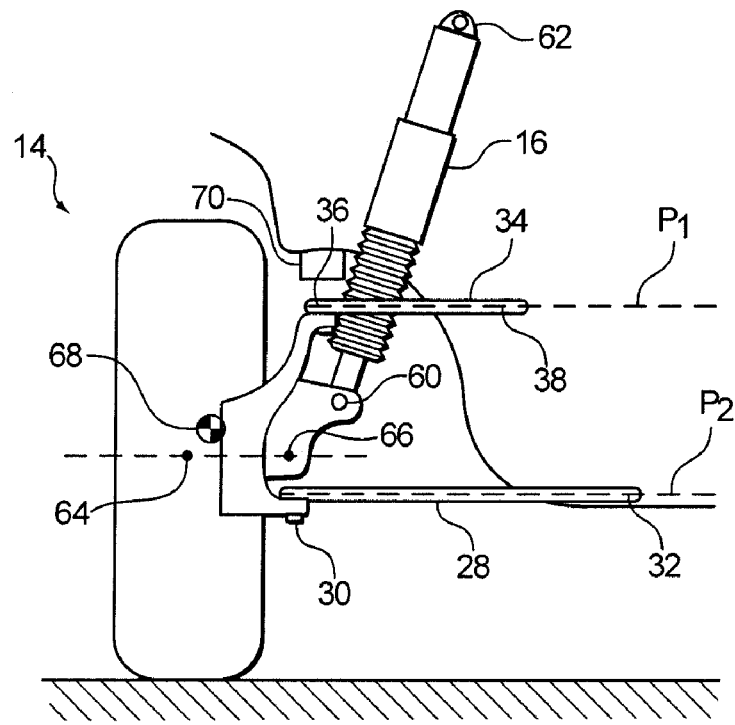
FIG. 4 is a schematic illustration of the rear suspension, as viewed from the front or rear of the vehicle.

FIG. 4 illustrates schematically one independent rear suspension 14, as viewed from the front or rear of the vehicle at rest. Upper control arm 34 is horizontal, with its outer ball joint 36 and inner bushes 38 all disposed within a single plane $P_1$ parallel to the road surface. Lower control arm 28 is substantially horizontal, in that its outer ball joint 30 and inner bushes 32 are all approximately within a single plane $P_2$ parallel to plane $P_1$. Actuator 16 is pivotably connected to the wheel assembly at a lower pivot 60 and to the body at an upper pivot 62. The geometric wheel center 64 and the center of the rear drive axle CV joint 66 are also illustrated, as is the center of gravity 68 of the effective unsprung mass. Jounce motion of the wheel assembly with respect to the vehicle body is limited by a mechanical stop 70, which may be functionally located within the housing of actuator 16. Rebound motion of the wheel assembly is similarly limited by a mechanical stop (not shown), which may be structured and positioned as generally known in the art, or within the housing of actuator 16.

Figure 5:
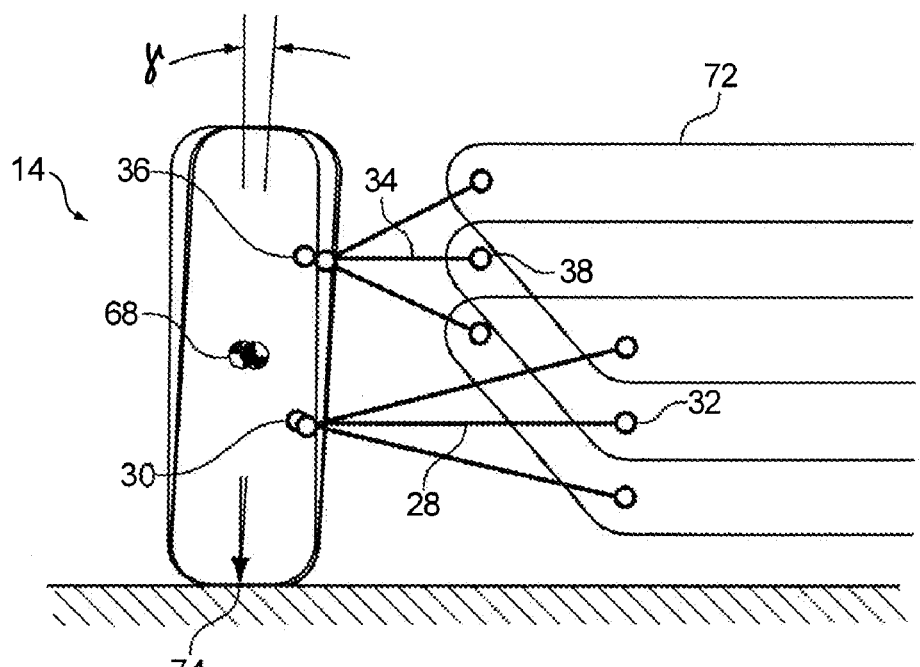
FIG. 5 illustrates jounce and rebound motion of the rear suspension.

As shown in FIG. 5, the rear suspension upper and lower control arms move through a range of motion as the wheel assembly traverses its full active travel over which the active suspension system applies controlled force to the wheel assembly. Preferably, such active range of travel will cover at least 80 percent of the full range of possible travel between mechanical stops (more preferably, it will cover the entire range of travel between fixed stops), and at least 0.2 meters for most passenger vehicle applications. For illustration, the control arms, body and wheel outline are shown in jounce (with body 72 at its lowest position with respect to the road surface), in rebound (with body 72 at its highest position with respect to the road surface), and at rest. The geometry of the various suspension links is preferably selected such that the center of contact 74 between the tire and road has very little lateral displacement through the active range of wheel motion, as the body moves along a vertical path as shown, to minimize lateral tire patch forces applied to the wheel assembly and, through the suspension, to the vehicle body. This can be accomplished, at least in part, by making the links long, level and parallel, which would normally be avoided to keep from positioning the roll center too low. As the active suspension avoids rolling, a lower roll center geometry is acceptable. Low lateral tire patch displacement is particularly beneficial in high-bandwidth active suspensions that are effective at substantially eliminating undesirable vertical accelerations due to road disturbances at speed, for as such disturbances are eliminated, lateral accelerations induced by ride-induced lateral tire patch motion become more noticeable and objectionable.

Figure 6:
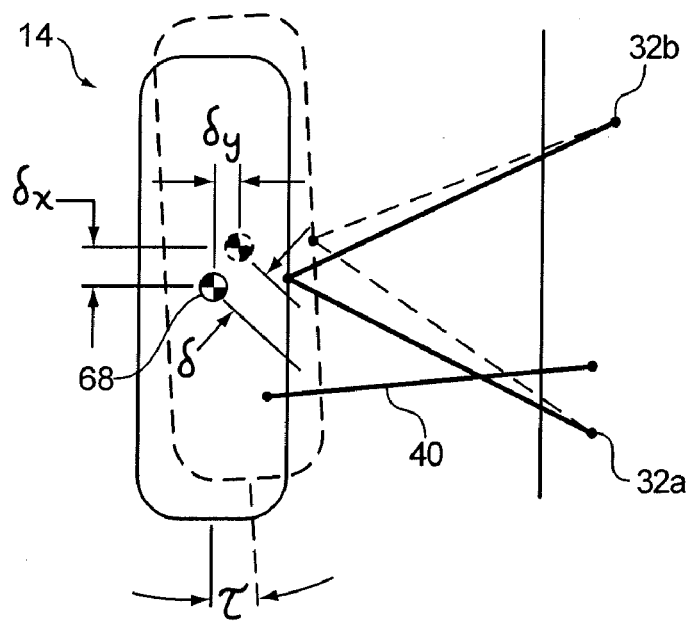
FIG. 6 is a schematic illustration of the rear suspension, as viewed from above.

FIG. 5 also illustrates that as the wheel assembly moves through its active jounce and rebound travel, the effective gravitational center 68 of the unsprung mass has some horizontal motion. As best seen in FIG. 6 (with displacements exaggerated for illustration), this horizontal displacement δ can be considered as being made up of two components: a fore-aft component $\delta_x$ and a lateral component $\delta_y$. I have found that subjective ride quality in active suspensions, particularly those with pronounced reduction in vertical accelerations at speed, is significantly improved by configuring the rear suspension to keep the overall horizontal kinetic displacement of each rear wheel assembly (the ratio of unsprung to sprung mass, times the horizontal wheel assembly displacement δ) below at least 4.0 millimeters, with even greater advantage at substantially lower horizontal kinetic displacement limits. The lateral component $\delta_y$, which generates lateral forces and accelerations to the suspension that can be objectionable in the absence of vertical acceleration content, is preferably kept sufficiently low that the horizontal kinetic displacement as measured laterally (i.e., along an axis extending perpendicular to the direction of vehicle travel) is less than about 3.5 millimeters. The fore-aft component $\delta_x$, which can generate local fore-aft forces and accelerations, is preferably kept sufficiently low that the horizontal kinetic displacement as measured in the fore-aft direction (i.e., along an axis extending perpendicular to the direction of vehicle travel) is less than about 1.5 millimeters. As demonstrated by the example outlined below, low horizontal kinetic wheel displacements are achievable even in the context of double-A arm and semi-trailing arm suspension configurations having control arm ball joints 36 and 30 disposed significantly outboard of their respective inner control arm bushes 38 and 32. In the case of a semi-trailing arm configuration, the ball joints may also be located significantly rearward of their respective control arm bushes. Various machines are available for measuring horizontal suspension and wheel displacements by moving the body up and down, such as the Suspension Parameter Measuring Machine SPMM 4000 available from Anthony Best Dynamics Ltd of Bradford-on-Avon, Wiltshire, UK.

While many suspension designers incorporate geometric toe alteration to affect the handling behavior of a vehicle, I have found that in the context of active suspensions with greatly mitigated vertical acceleration content, significant toe change during jounce and rebound (labeled τ in FIG. 6) can be subjectively objectionable, both in terms of passenger comfort and perceived safety and control. As active suspension control eliminates body roll, toe change can cause what many characterize as self-steer or wander. This effect is exacerbated by the greater use of extreme wheel travel in active suspensions. I have found that if toe change τ is kept below about 0.1 degree over the active control range (preferably, under 0.083 degrees over the entire range of travel between stops), the self-steering effect is substantially reduced. Ideally, no toe change should occur when the wheels compress or rebound. It will be understood that dynamic toe change can be controlled by proper selection of appropriate suspension geometry and elastic bushing properties. Toe change can be measured approximately as the angulation of the wheel rim about a vertical axis during vertical travel under quasi-static conditions.

Referring back to FIG. 5, it is similarly advantageous in the context of active suspensions with substantially no body roll to keep the overall camber change γ to less than about plus or minus 3.0 degrees through active vertical wheel motion. By keeping the tire substantially vertical, available tire cornering force is maximized while lateral unsprung mass inertial forces are also avoided. However, some minor camber change may be accommodated if necessary to reduce tread width changes (discussed below). For example, in the rear suspension application detailed below, +/−2.0 degrees of camber change was incorporated to keep the tread width change under about 2.5 millimeters. Preferably, the tires are selected to be generally insensitive to camber change. To that end, radial tires are preferred.

Figure 7:
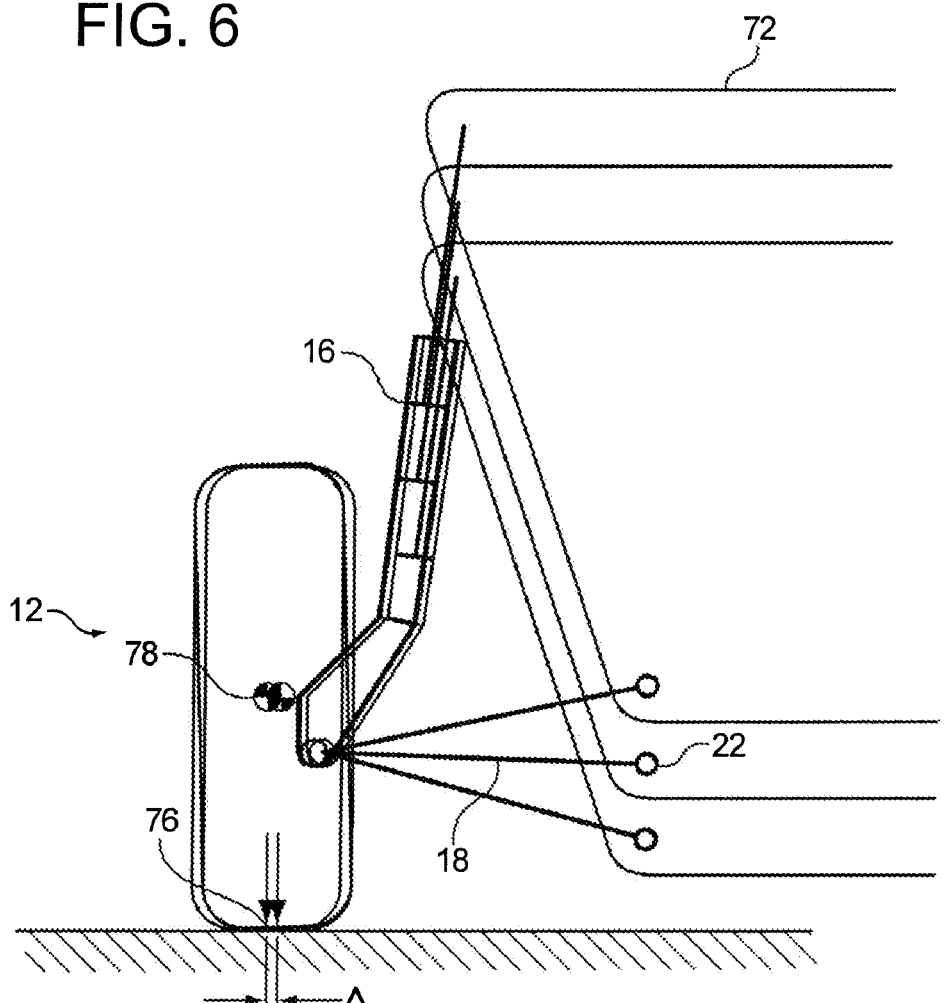
FIG. 7 is a schematic illustration of the front suspension, as viewed from the front or rear of the vehicle.

FIG. 7 schematically illustrates the active range of motion of front suspension 12 through jounce and rebound. Actuator 16 is positioned for zero scrub radius at the tire patch. As shown, vertical suspension motion results in a small lateral displacement Δ of tire contact patch center 76 as the body 72 moves along a purely vertical path. Displacement Δ is also known as a tread width change. As long as the front axle is ahead of the passenger compartment, a significant amount of front suspension tread width change Δ is tolerable. However, axles behind the occupants must be limited to extremely small tread changes, otherwise the resulting lateral forces creates the uncomfortable perception that someone is pushing the rear of the vehicle from side-to-side. Tread width change Δ in the front suspension is preferably less than about 35 millimeters, more preferably less than about 20 millimeters. Tread width change in the rear suspension is more noticeable and objectionable, and I prefer to keep rear tread width change to below 10 millimeters, more preferably less than 5 millimeters.

Keeping tread width change this low will tend to suggest keeping the suspension roll centers close to the ground. For example, the roll center location above the road surface can be estimated directly from the tread width change vs. wheel travel curve by looking at the intersection of a line perpendicular to a tangent on that curve with a line that represents the lateral centerline of the vehicle. The height of this intersection point above the road is approximately the Roll Center Height (RCH). However, as active suspension control can effectively eliminate body roll, the amount of roll in an ideally tuned active suspension vehicle will not change with a lower roll center. In many applications, the improvement in comfort obtained by limiting tread width change will be worth some increased actuator force necessary to resist roll. In many applications, and with sufficient actuator force available, roll center height should be optimized for minimal tread width change. Some tread width change can be tolerated for lower actuator force and system power requirements. Preferably, the maximum tread change is less than about 20 millimeters in the front suspension and less than about 5 millimeters in the rear. The difference in preferred ranges between front and rear comes from our observations on prototype active vehicles that passengers tend to be subjectively more disturbed by lateral forces originating from the rear of the vehicle. Preferably, the front RCH should be no more than about 5 percent of the front static tread width, and the rear RCH should be no more than about 1.25 percent of the rear static tread width.

Preferably, the product of lateral tire patch displacement Δ and non-rotating lateral tire stiffness is kept to less than about 500 pounds, preferably less than about 150 pounds. Tread width change may be measured in a garage using lateral bearing pads such as those employed on wheel alignment machines, by measuring the lateral displacement of the pads as the vehicle body is moved slowly up and down through its jounce and rebound motion, with the lateral displacement at each wheel taken to be one-half of the total vehicle track width change, assuming symmetrical suspension properties. Lateral tire stiffness should be measured as the average tire stiffness over about the first 10 millimeters of lateral tire patch displacement.

In one example, a stock 1994 LEXUS LS400 was modified to include front and rear suspensions generally as illustrated in FIG. 1, with the functional suspension link points positioned according to the table below. The "X" coordinates indicate the distance, in millimeters, from the wheel center as measured along the fore-aft axis of the vehicle. The "Y" coordinates indicate the distance, in millimeters, from the fore-aft centerline of the vehicle as measured laterally and perpendicular to the fore-aft direction. The "Z" coordinates indicate the vertical distance, in millimeters, from the wheel center. The left column of the table corresponds to reference numbers in the drawings. Values are given for one side of the vehicle only; locations of suspension points on the other side of the vehicle can be derived by mirroring about the fore-aft center plane of the vehicle.

| | | X | Y | Z |
|---|---|---|---|---|
| | FRONT SUSPENSION | | | |
| 78 | Wheel Center | 0.00 | 786.10 | 0.00 |
| 80 | Upper actuator joint | −38.30 | 550.21 | 584.05 |
| 82 | Lower actuator joint | 0.30 | 633.91 | −1.45 |
| 22a | Lower arm, front bush | 424.94 | 352.43 | −82.22 |
| 22b | Lower arm, rear bush | 7.29 | 352.43 | −104.11 |
| 20 | Lower arm ball joint | 8.48 | 728.47 | −126.82 |
| 84 | Inner tie rod pivot | 87.93 | 353.06 | −79.17 |
| 86 | Outer tie rod ball joint | 132.51 | 754.02 | −97.56 |
| | REAR SUSPENSION | | | |
| 64 | Wheel center | 0.00 | 786.92 | 0.00 |
| 66 | Wheel CV joint | −0.38 | 676.43 | 0.00 |
| 38a | Upper arm, front bush | 102.64 | 444.50 | 151.49 |
| 38b | Upper arm, rear bush | −115.09 | 444.50 | 140.06 |
| 36 | Upper arm ball joint | −6.02 | 700.38 | 141.91 |

-continued

|  |  | X | Y | Z |
|---|---|---|---|---|
| 32a | Lower arm, front bush | 6.12 | 238.13 | −90.12 |
| 32b | Lower arm, rear bush | −316.13 | −238.13 | −107.01 |
| 30 | Lower arm ball joint | 6.32 | 706.42 | −93.90 |
| 62 | Upper actuator joint | −43.51 | 513.84 | 714.98 |
| 60 | Lower actuator joint | −3.28 | −611.15 | 86.79 |
|  | Inner toe link bush | −187.38 | 295.28 | −66.75 |
|  | Outer toe link ball joint | −122.00 | 717.04 | −68.83 |
|  | Halfshaft/Differential joint | 17.58 | 130.94 | 14.96 |

In this application, the rear actuators had an active travel range of 108 millimeters in jounce and 108 millimeters in rebound, for a total active range of over 200 millimeters. The front actuators had an active travel range of 108 millimeters in jounce and 108 millimeters in rebound.

The front of this active Lexus had a static Roll Center Height (RCH) of 87 millimeters (calculated at the active suspension ride height which is approximately at the center of suspension travel). This resulted in a tread width change of about 35 millimeters, which is more than I prefer. The rear of the Lexus had a RCH of 0 millimeters and a maximum rear tread change of only 2.3 millimeters.

A number of embodiments of the invention have been described. Nevertheless, it will be understood that various modifications may be made without departing from the spirit and scope of the invention. Accordingly, other embodiments are within the scope of the following claims.

What is claimed is:

1. An active wheel suspension for suspending a wheel assembly from a sprung body of a wheeled vehicle, and adapted to permit a center of the wheel assembly to move relative to the sprung body through a jounce and rebound travel and defining a wheel center locus path relative to the body, the suspension comprising:
   an actuator connected to both the wheel assembly and the sprung body and adapted to apply an active control force between the body and wheel assembly to move the wheel assembly;
   wherein a tangent to the wheel center locus path is inclined rearward at an angle that corresponds to a resultant direction of a road surface force such that the active control force is applied on the wheel assembly in a direction opposite to the resultant direction.

2. The active wheel suspension of claim 1 wherein the suspension is configured to move the wheel center through jounce and rebound along a substantially linear path with respect to the body, the linear path inclined rearward with respect to vertical.

3. The active wheel suspension of claim 1 wherein the tangent to the wheel center locus path with the wheel center at nominal ride height defines a recession angle in a fore-aft plane with respect to vertical, the recession angle being between about 1 and 5 degrees.

4. The active wheel suspension of claim 3 wherein the recession angle is between about 2 and 4 degrees.

5. The active wheel suspension of claim 4 wherein the recession angle is about 3 degrees.

6. The active wheel suspension of claim 1, further comprising an actuator adapted to vary the rearward inclination of the tangent to the wheel center locus path as a function of vehicle speed.

7. The active wheel suspension of claim 6, wherein the magnitude of the rearward inclination of the tangent to the wheel center locus path is configured to vary inversely with vehicle speed.

8. The active wheel suspension of claim 1 wherein the actuator comprises an electromagnetic actuator.

9. The active wheel suspension of claim 8 wherein the actuator comprises a linear motor.

10. The active wheel suspension of claim 1 wherein the wheel suspension comprises a front wheel suspension of an automobile.

11. The active wheel suspension of claim 10 wherein the actuator is positioned as a strut.

12. The active wheel suspension of claim 1 wherein the wheel suspension comprises a rear wheel suspension of an automobile.

13. The active wheel suspension of claim 1 wherein the wheel assembly has a horizontally unsprung mass weight greater than about 120 pounds.

14. The active wheel suspension of claim 1 wherein the wheel assembly includes a damper mass vertically sprung with respect to the wheel assembly.

15. The active wheel suspension of claim 1 configured to produce an active control force between the body and wheel assembly over an active control range of at least 0.2 meters along the wheel center locus path.

16. The active wheel suspension of claim 1 further comprising mechanical stops limiting a jounce and rebound travel, wherein the mechanical stops are positioned to allow at least about 2.0 inches (50 millimeters) of jounce and about 2.0 inches (50 millimeters) of rebound.

17. The active wheel suspension of claim 1 defining a geometry selected to produce a maximum tread width change of less than about 5 millimeters through said jounce and rebound.

18. The active wheel suspension of claim 1 further comprising a structural link coupled to the wheel assembly to define a relative rotation center, and rotationally coupled to the sprung body at a pivot.

19. The active wheel suspension of claim 18 wherein the structural link is a first structural link coupled to the wheel assembly to define a first relative rotation center, and rotationally coupled to the sprung body at a first pivot, the suspension further comprising a second structural link coupled to the wheel assembly to define a second relative rotation center above the first relative rotation center, and rotationally coupled to the sprung body at a second pivot above the first pivot.

20. The active wheel suspension of claim 1 defining a geometry selected to produce a maximum horizontal kinetic displacement of the wheel assembly of less than about 4.0 millimeters as the actuator moves through its active control range.

21. The active wheel suspension of claim 20 wherein the active control range covers a vertical displacement of a gravitational center of the wheel assembly of at least 0.2 meters.

22. The active wheel suspension of claim 1 defining a geometry selected to produce a maximum wheel toe change of less than about 0.1 degrees through said jounce and rebound travel.

23. The active wheel suspension of claim 1 wherein lateral displacement of a tire patch defined between the wheel assembly and a support surface, multiplied by lateral tire stiffness, yields a maximum product of less than about 500 pounds (2200 Newtons).

24. The active wheel suspension of claim 1 wherein overall angulation of a wheel rim of the wheel assembly about a vertical axis through the jounce and rebound travel, multiplied by a cornering stiffness of a tire of the wheel assembly, yields a product of less than about 30 pounds (130 Newtons).

25. The active wheel suspension of claim 1, wherein the wheel suspension comprises a rear wheel suspension, the rear wheel suspension comprising:
an upper structural member coupled to the wheel assembly to define an upper relative rotation center, and rotationally coupled to the sprung body at an upper pivot; and
a lower structural member coupled to the wheel assembly to define a lower relative rotation center disposed on a side of a gravitational center of the wheel assembly opposite the upper relative rotation center, and rotationally coupled to the sprung body at a lower pivot.

26. An active wheel suspension for suspending a wheel assembly from a sprung body of a wheeled vehicle, and adapted to permit a center of the wheel assembly to move relative to the sprung body through a jounce and rebound travel and defining a wheel center locus path relative to the body, the suspension comprising:
an actuator connected to both the wheel assembly and the sprung body and adapted to apply an active control force between the body and wheel assembly to move the wheel assembly;
wherein a tangent to the wheel center locus path is inclined rearward at an angle that corresponds to a resultant direction of a road surface force such that the active control force is applied on the wheel assembly in a direction opposite to the resultant direction, the angle being between about 1 and 5 degrees with the wheel center at nominal ride height;
wherein the suspension is configured to move the wheel center through jounce and rebound along a substantially linear path with respect to the body, the linear path inclined rearward with respect to vertical.

27. A method of actuating an active wheel suspension of a wheeled vehicle, the method comprising:
applying an active control force between a sprung vehicle body and wheel assembly to move the wheel assembly; and
moving a center of the wheel assembly relative to the sprung body through a jounce and rebound travel along a wheel center locus path relative to the body, wherein the tangent to the wheel center locus path is inclined rearward at an angle that corresponds to a resultant direction of a road surface force such that the active control force is applied on the wheel assembly in a direction opposite to the resultant direction.

28. The method of claim 27 further comprising moving the center of the wheel assembly through jounce and rebound along a substantially linear path with respect to the body.

29. The method of claim 27 further comprising varying the rearward inclination of the tangent to the wheel center locus path as a function of vehicle speed.

30. The method of claim 29 wherein the magnitude of the rearward inclination of the tangent to the wheel center locus path is configured to vary inversely with vehicle speed.

31. An active wheel suspension for suspending a wheel assembly from a sprung body of a wheeled vehicle, and adapted to permit a center of the wheel assembly to move relative to the sprung body through a jounce and rebound travel, the suspension comprising: an electromagnetic actuator connected to both the wheel assembly and the sprung body and adapted to apply an active control force between the body and wheel assembly to move the wheel assembly, the active control force being applied on the wheel assembly in a direction opposite to a resultant direction of a road surface force and at an angle corresponding to an angle of the resultant force; a housing of the actuator, and a mechanical stop within the housing.

32. The active wheel suspension of claim 31 wherein the actuator comprises a linear motor.

33. The active wheel suspension of claim 31 wherein the wheel suspension comprises a front wheel suspension of an automobile.

34. The active wheel suspension of claim 33 wherein the actuator is positioned as a strut.

35. The active wheel suspension of claim 31 wherein the wheel suspension comprises a rear wheel suspension of an automobile.

36. The active wheel suspension of claim 31, wherein the mechanical stop limits a jounce travel.

37. The active wheel suspension of claim 36, wherein the mechanical stop is positioned to allow at least about 2.0 inches (50 millimeters) of jounce.

38. The active wheel suspension of claim 31, wherein the mechanical stop limits a rebound travel.

39. The active wheel suspension of claim 38, wherein the mechanical stop is positioned to allow at least about 2.0 inches (50 millimeters) of rebound.

40. The active wheel suspension of claim 31, further including, an additional mechanical stop within the housing.

41. The active wheel suspension of claim 40, wherein one of the mechanical stop and additional mechanical stop limits a jounce travel, and the other of the mechanical stop and additional mechanical stop limits a rebound travel.

42. The active wheel suspension of claim 41, wherein one of the mechanical stop and additional mechanical stop is positioned to allow at least about 2.0 inches (50 millimeters) of jounce, and the other of the mechanical stop and additional mechanical stop is positioned to allow at least about 2.0 inches (50 millimeters) of rebound.

43. The active wheel suspension of claim 35 wherein the actuator is positioned as a strut.

* * * * *